United States Patent [19]

Kawabata et al.

[11] Patent Number: 5,140,567
[45] Date of Patent: Aug. 18, 1992

[54] METHOD FOR CONTROLLING RECORDING MEDIUM PLAYER AND TAPE DECKS

[75] Inventors: Yoshihiro Kawabata; Kazuya Tsukada, both of Tokyo, Japan

[73] Assignee: Pioneer Electronic Corporation, Tokyo, Japan

[21] Appl. No.: 475,277

[22] Filed: Feb. 5, 1990

[30] Foreign Application Priority Data

Feb. 7, 1989 [JP] Japan .................................. 1-28960

[51] Int. Cl.$^5$ ...................... H04B 1/20; G11B 11/00; G11B 3/64; G11B 5/86
[52] U.S. Cl. ......................................... 369/13; 369/3; 369/84; 369/85; 360/15
[58] Field of Search ...................... 369/13, 14, 15, 1-3, 369/84, 85; 360/15, 17

[56] References Cited

U.S. PATENT DOCUMENTS

| | | | |
|---|---|---|---|
| 4,628,370 | 12/1986 | Fukuoka | 360/15 |
| 4,703,465 | 10/1987 | Parker | 369/30 |
| 4,841,503 | 6/1989 | Yamada et al. | 369/85 X |
| 4,866,543 | 9/1989 | Cooper et al. | 360/15 |
| 4,901,302 | 2/1990 | Yamada | 369/85 |
| 4,916,559 | 4/1990 | Yamagishi et al. | 360/15 |
| 4,993,008 | 2/1991 | Shiba | 369/2 |

FOREIGN PATENT DOCUMENTS

| | | |
|---|---|---|
| 58-130455 | 8/1983 | Japan . |
| 0050626 | 3/1985 | Japan ................................... 369/85 |
| 61-216147 | 9/1986 | Japan . |

Primary Examiner—Stuart S. Levy
Assistant Examiner—Tan Nguyen
Attorney, Agent, or Firm—Fleit, Jacobson, Cohn, Price, Holman & Stern

[57] ABSTRACT

Two tape decks are connected to a player that plays back a recording medium. The reproduced sound is recorded on two magnetic tapes by the tape decks operating in parallel. During the recording, one of the decks stops earlier than the other because of difference in tape length and issues a tape-end signal. In response to the tape-end signal, the player is controlled to search for and reach the last recorded piece of music while the tape decks are rewound, paused or otherwise controlled singly or in combination in a suitable time sequence. This makes it possible to edit the tapes of different lengths during continuous recording without leaving blank periods on either tape.

9 Claims, 11 Drawing Sheets

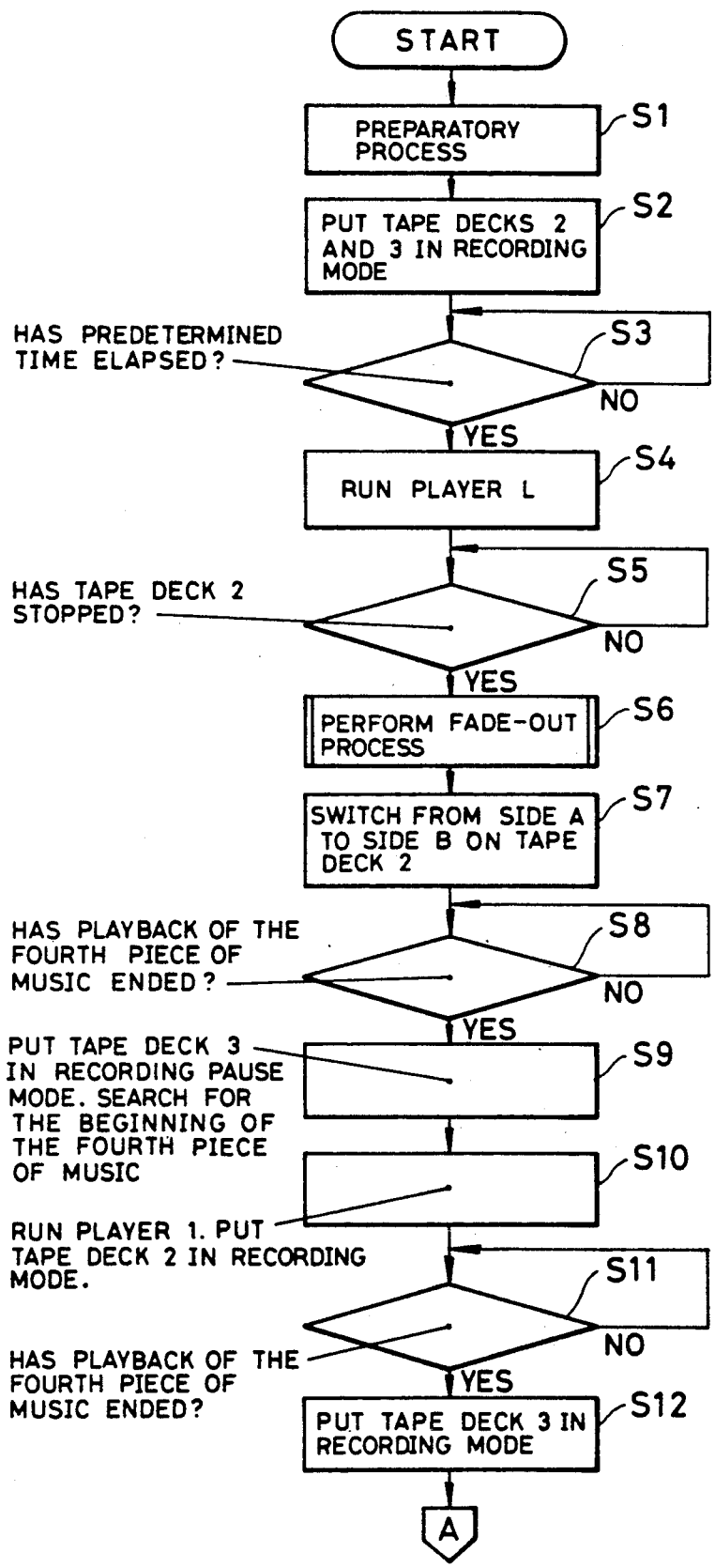

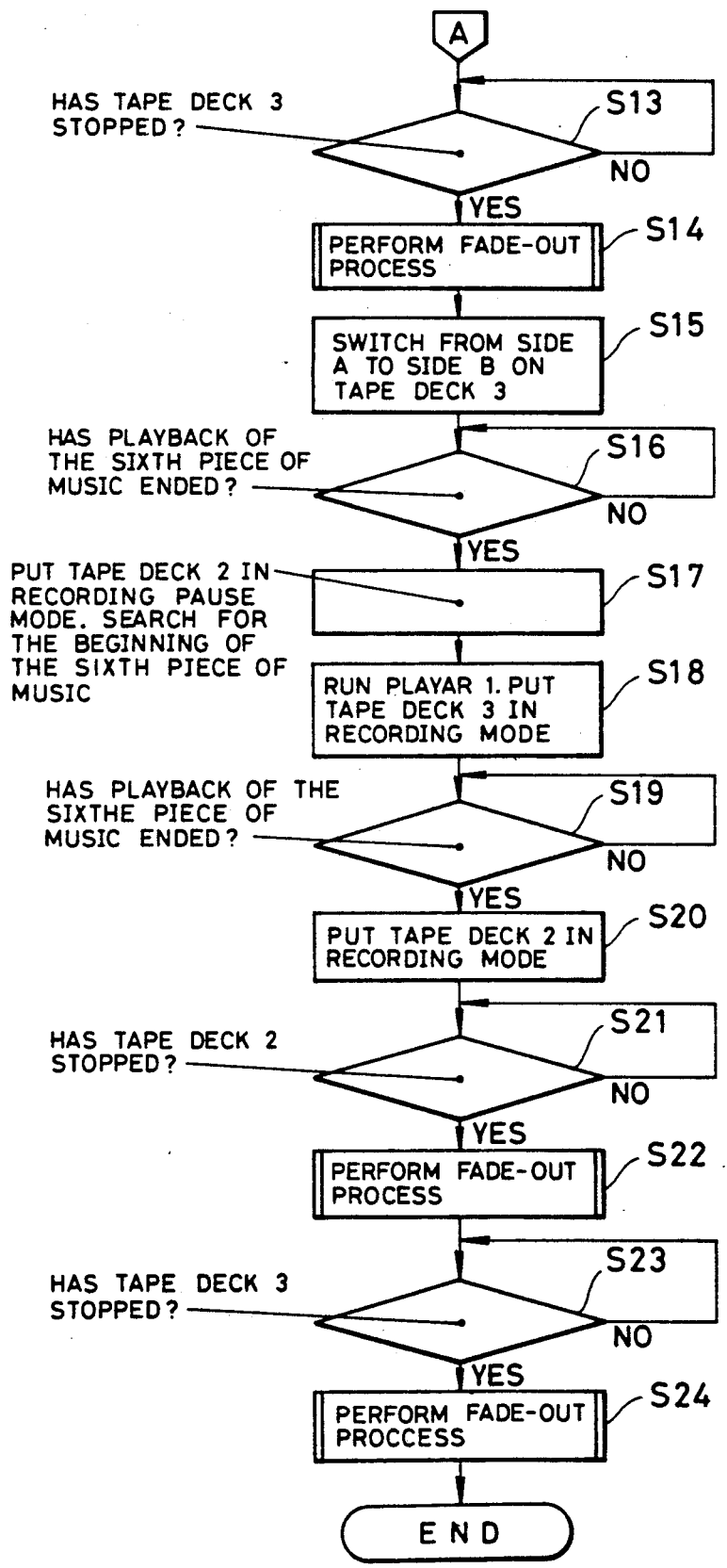

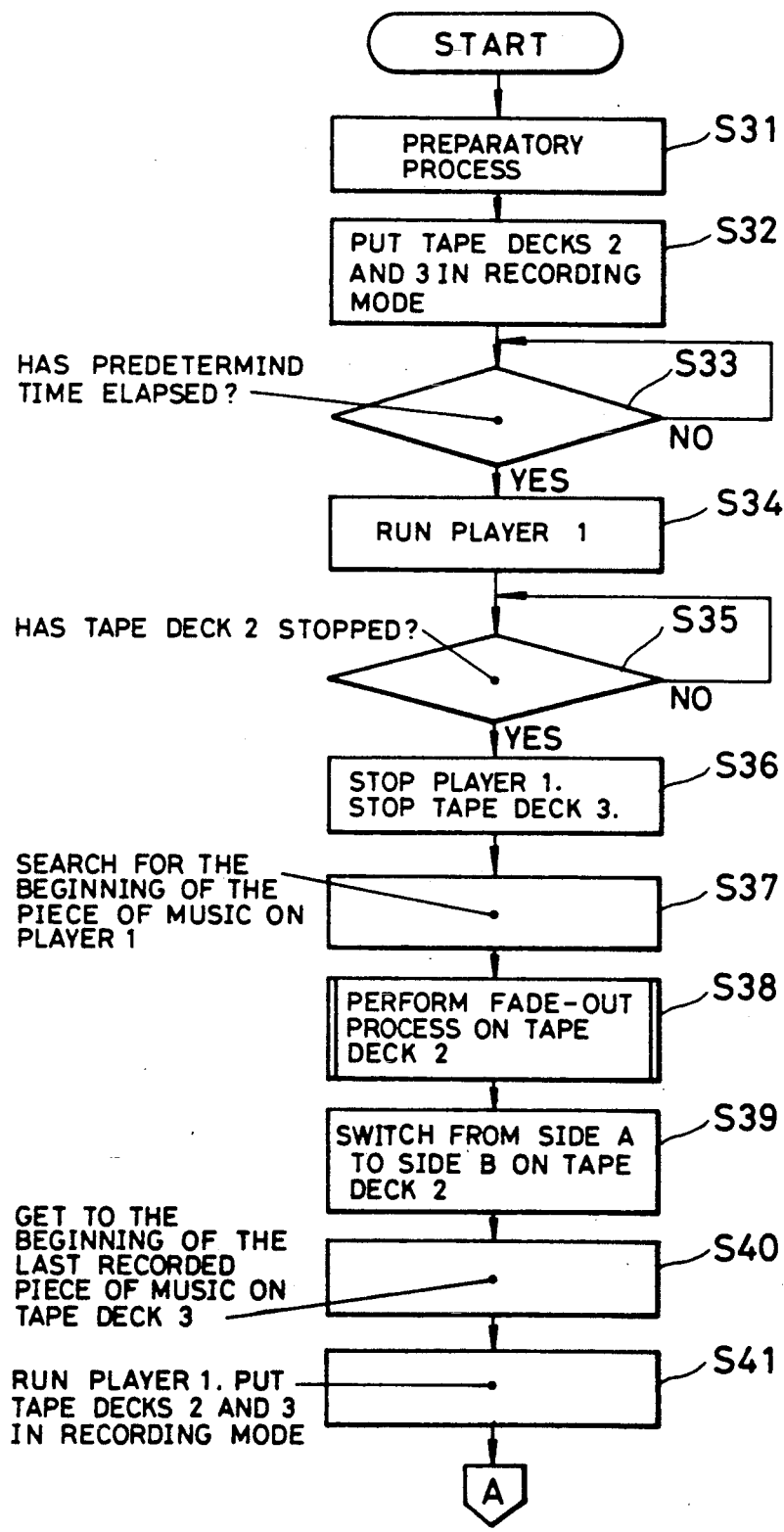

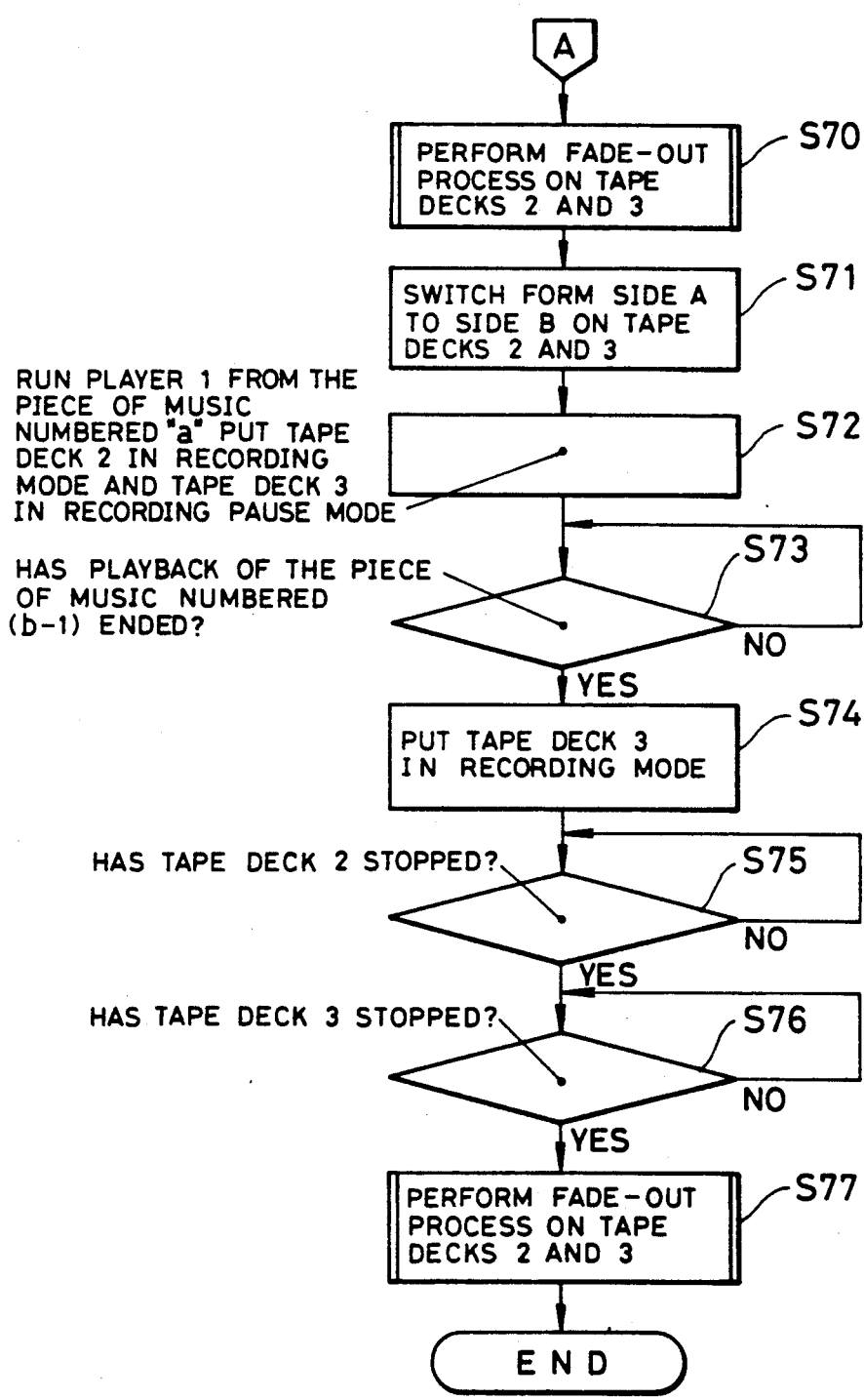

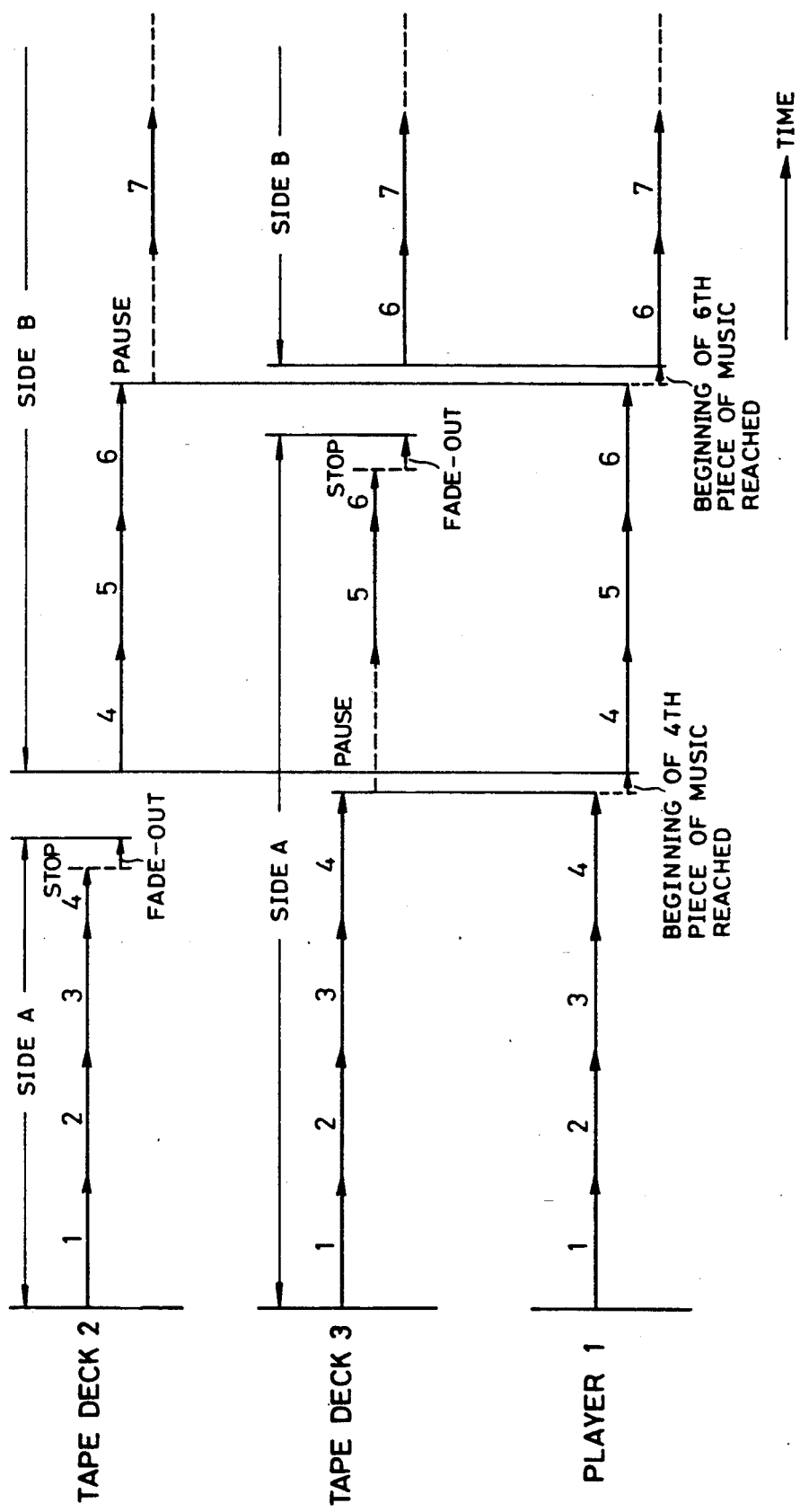

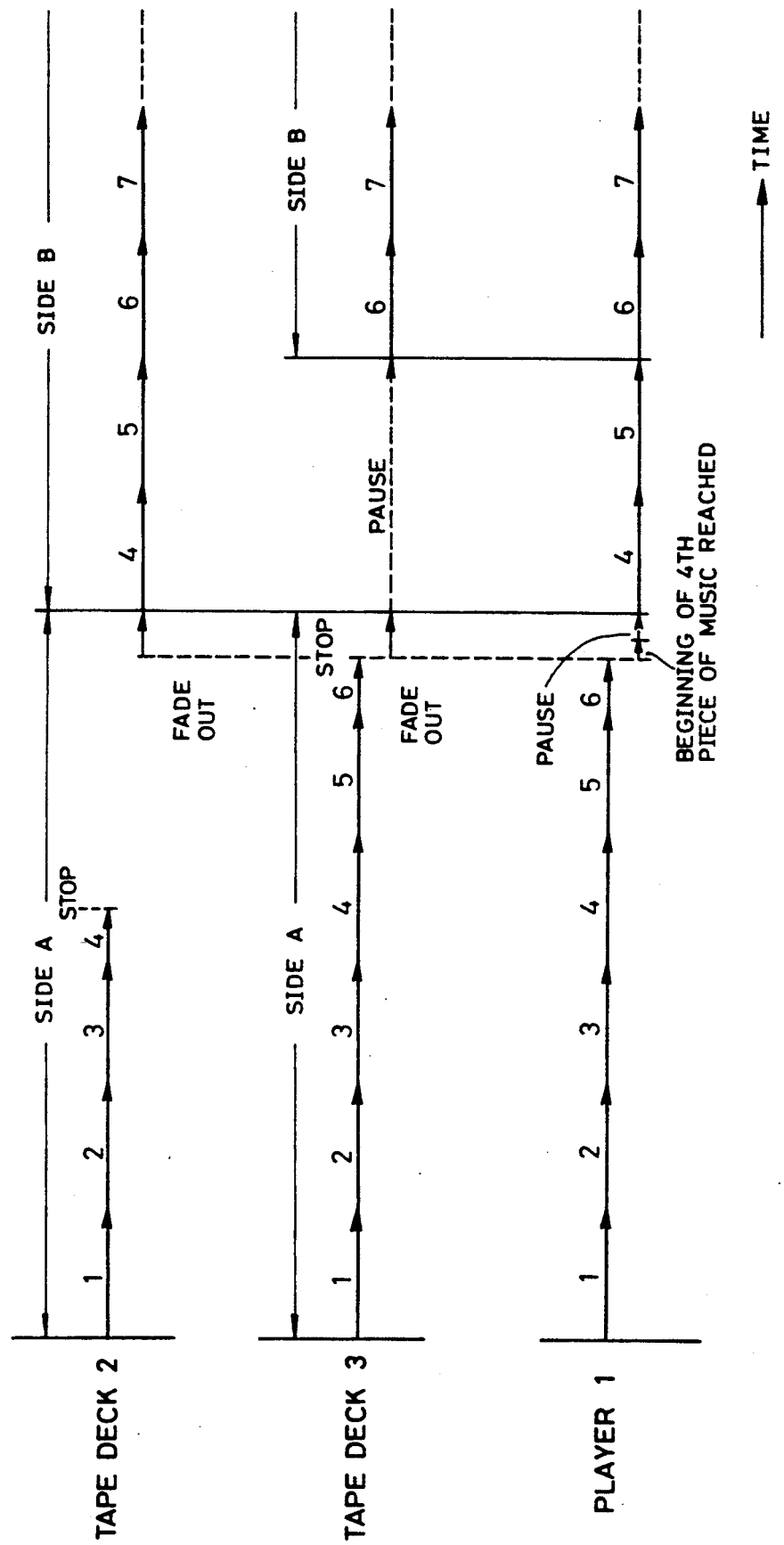

METHOD FOR CONTROLLING RECORDING MEDIUM PLAYER AND TAPE DECKS

BACKGROUND OF THE INVENTION

1. Field of the Invention

The present invention relates to a method for controlling a recording medium player and tape decks and, more particularly, to a method for having a single recording medium player play a recording medium containing a plurality of collections of information (each collection constituting a piece of music) in order to record the reproduced sound onto at least two magnetic tapes that are run in parallel by at least two tape decks.

2. Description of the Related Art

A compact disc (CD) is, for example, used as a recording medium that contains a plurality of pieces of music. The CD is played by a recording medium playing device called a CD player. The CD player may be, for example, connected to two tape decks. As the CD is being played by the CD player, the two tape decks may operate in parallel to record the pieces of music reproduced therefrom onto two magnetic tapes, one being run on each deck.

In the set-up above, two magnetic tapes of the same length (for the same recording time) are usually loaded onto the two tape decks. However, there may be a case where two magnetic tapes have a different length each. In that case, what the operator of the equipment has conventionally done is as follows: When side A of the shorter magnetic tape comes to an end, the operator stops the recording operation on the longer magnetic tape after allowing the piece of music being last recorded thereon to fade out. The operator then gets the CD player to search for the beginning of that last piece of music on the CD. On the two tape decks, the operator changes the magnetic tapes from side A to side B. After the side change, the running of the CD player and the recording operation of the tape decks are both resumed so that the last recorded piece of music is again recorded from its beginning on side B of both tapes.

This means that on the longer magnetic tape, the remaining part of side A and the same length of the first portion of side B remain unrecorded. This waste of recording resources is obviously not desirable from the point of view of effective tape editing.

SUMMARY OF THE INVENTION

It is therefore the primary object of the present invention to provide a method for controlling a recording medium player and tape decks whereby waste-free tape editing is made available for magnetic tapes of different lengths on the tape decks.

According to one aspect of the present invention, there is provided a method for controlling a recording medium player and tape decks as follows: A single recording medium player plays a recording disk containing a plurality of pieces of music, the reproduced sound being recorded onto at least two magnetic tapes that are run in parallel by at least two tape decks connected thereto. When one of the two tape decks outputs a tape end signal earlier than the other deck during their parallel recording operation, the ending part of the piece of music being last recorded on the earlier-stopped tape deck is made to fade out. The earlier-stopped tape deck is then controlled so as to switch to the other recording side of the tape thereon. At the same time, the player is allowed to continue its operation so that the other tape deck records the currently playing piece of music until its end is reached. At the end of the last recorded piece of music, the other tape deck is placed in the standby mode, and the player is stopped. Then the player is controlled so as to search for the beginning of the last recorded piece of music on the recording medium. With the beginning found and set, the player is made to resume its acourstic reproduction and the earlier-stopped tape deck to begin its recording. In this manner, the two tape decks start their parallel recording operation at that point in time where the earlier-stopped tape deck completes its recording of the last piece of music.

According to another aspect of the present invention, there is provided a method for controlling a recording medium player and tape decks as follows: During the parallel recording operation of two tape decks, one of the decks may output a tape end signal earlier than the other while a piece of music is being reproduced by a player connected thereto. In that case, the operation of both the player and the other tape deck is immediately stopped. The player is then controlled so as to search for the beginning of the last recorded piece of music. At the same time, the earlier-stopped tape deck is controlled so that the ending part of the last recorded piece of music fades out, followed by a switch to the other recording side of the magnetic tape thereon. The other tape deck is controlled so as to search for the beginning of the last recorded piece of music on the magnetic tape thereon. With the beginning of the last recorded music found and set on the other tape deck, both the running of the player and the parallel recording operation of the two tape decks are resumed.

According to yet another aspect of the present invention, there is provided a method for controlling a recording medium player and tape decks as follows: When two tape decks running in parallel record audio signals from a recording medium player connected thereto, one of the tape decks may output a tape end signal earlier than the other deck. In that case, the player is allowed to continue its operation until the recording operation on the current recording side of the magnetic tape comes to an end on the other tape deck. When the other tape deck has stopped its recording operation, the player is stopped, and is then controlled so as to search for the beginning of the piece of music last recorded on the earlier-stopped tape deck. At the same time, the two tape decks are controlled so that the last recorded piece of music is made to fade out on each deck, followed by a switch to the other recording side of each magnetic tape. Then the running of the player and the recording of the earlier-stopped tape deck are resumed, with the other tape deck placed in the standby mode. When the player starts reproducing the piece of music last recorded on the other tape deck, the two tape decks begin their parallel recording operation of the same piece of music.

BRIEF DESCRIPTION OF THE DRAWINGS

FIGS. 4A, 5A-B and 6A-B are flowcharts indicating the processing steps constituting the control method according to the present invention; and FIGS. 7, 8 and 9 are timing charts that help to describe the processes making up the flowcharts of FIGS. 4, 5 and 6.

DETAILED DESCRIPTION OF A PREFERRED EMBODIMENT

There will now be described a preferred embodiment in detail by referring to the accompanying drawings.

Figure 1:
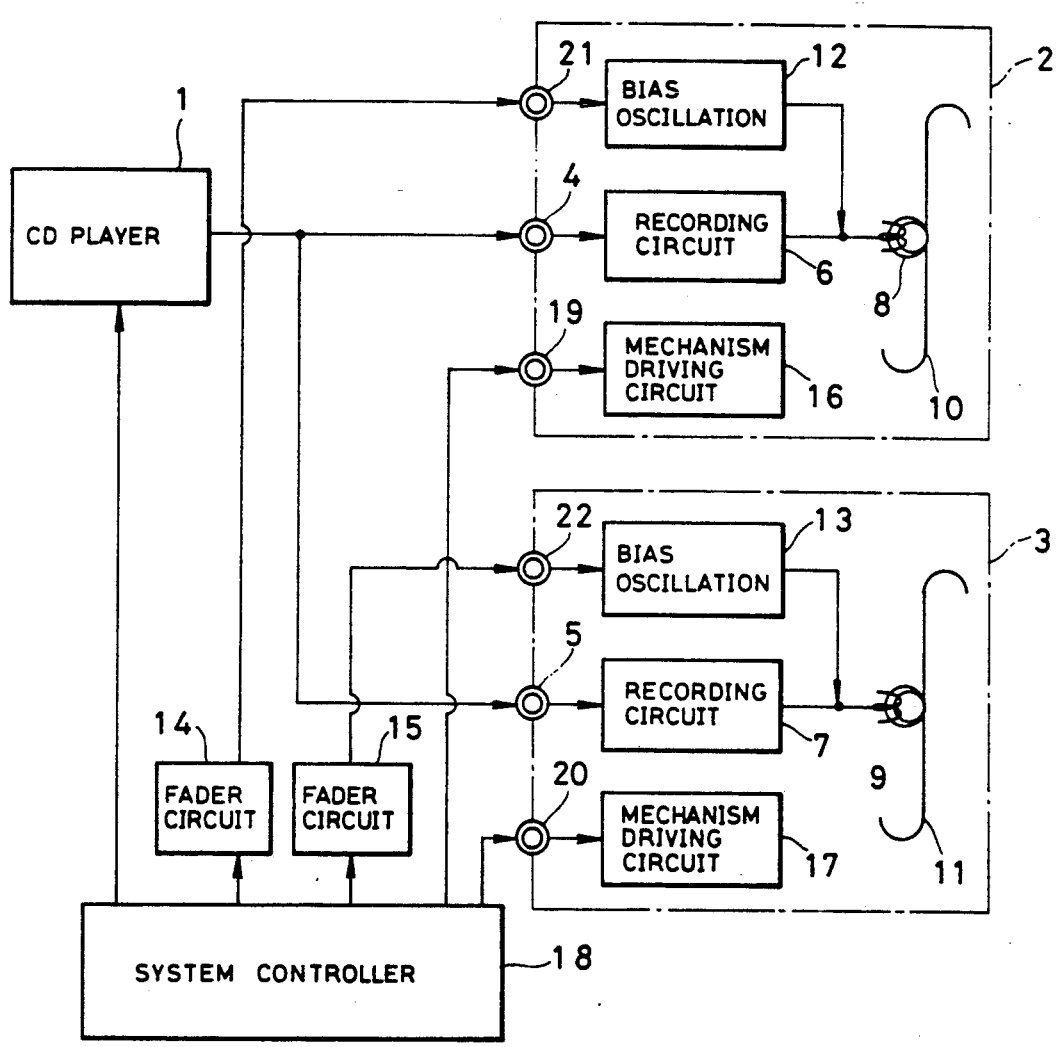
FIG. 1 is a block diagram of a tape editing system configuration to which is applied the control method according the present invention.

FIG. 1 is a block diagram illustrating a tape editing system to which is applied the control method according to the present invention. In this figure, reference numeral 1 is a CD player used as recording medium player. Two tape decks 2 and 3 are illustratively connected to the CD player 1. The reproduction output of the CD player 1 is supplied to recording circuits 6 and 7 via audio input terminals 4 and 5 of the tape decks 2 and 3, respectively. After being equalized and adjusted in level by the recording cuicuits 6 and 7, the reproduction output is fed to recording heads 8 and 9 for recording onto magnetic tapes 10 and 11. Bias oscillation circuits 12 and 13 of the tape decks 2 and 3, respectively, output a high frequency bias current that is superimposed on the signal to be recorded. Constant speed tape drive mechanisms, tape winding and rewinding mechanisms and head mechanisms, not shown, are controlled by mechanism driving circuits 16 and 17.

The operation status of the CD player 1 and of the tape decks 2 and 3 is controlled by a system controller 18. The system controller 18 comprises a microcomputer arrangement. Various control signals are output by the system controller 18 to control the operation of the tape decks 2 and 3. These signals are input to the mechanism driving ciucuits 16 and 17 via control input terminals 19 and 20. The tape decks 2 and 3 are provided respectively with fader circuits 14 and 15. These circuits are designed to drop gradually the recording signal level, a process known as fade-out, in the two tape decks. The fader circuits 14 and 15 are turned on and off by the system controller 18 as well. The outputs from the fader circuits 14 and 15 are input to the bias oscillation circuits 12 and 13 via control input terminals 21 and 22 of the tape decks 2 and 3.

Figure 2:
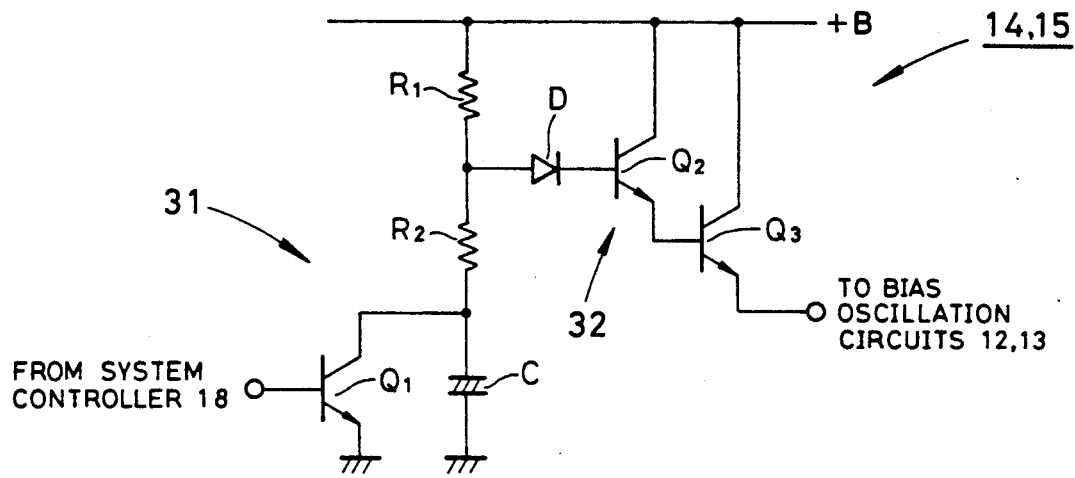
FIG. 2 is a circuit diagram of a fader circuit shown in FIG. 1.

FIG. 2 shows a typical circuit diagram of the fader circuits 14 and 15. As illustrated, the cuicuits 14 and 15 each comprise potential resistors $R_1$ and $R_2$ serially connected between a power supply $+B$ and ground; a charge and discharge circuit 31 formed of a capacitor C and a transistor $Q_1$ connected in parallel thereto; transistors $Q_2$ and $Q_3$ in Darlington connection; and a bias circuit 32 made up of a diode D connected between a partial potential point formed by the potential resistors $R_1$ and $R_2$ on the one hand, and the base of the transistor $Q_2$ on the other. The base input of the transistor $Q_1$ is the control input from the system controller 18. The emitter output of the transistor $Q_3$ provides a control input to the bias oscillation circuit 12 and 13 in the tape decks 2 and 3.

Figure 3:
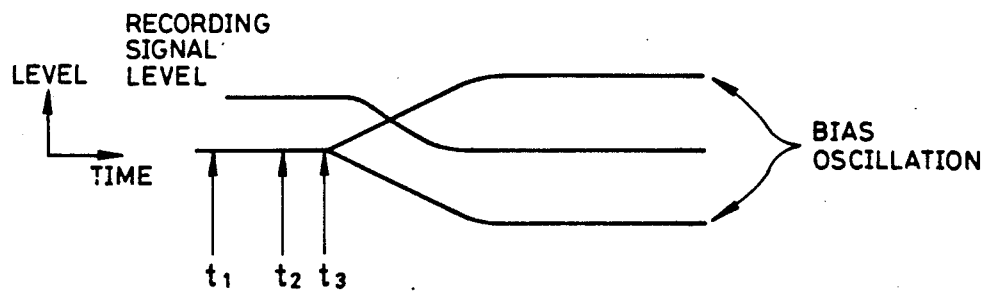
FIG. 3 is a waveform chart that helps to describe how the circuit of FIG. 2 works.

The fader ciucuits 14 and 15, with their composition as described above, provide fade-out processing on the recorded portion of a magnetic tape. The operations involved in the processing will now be described by referring to the waveform diagram in FIG. 3. At point of time $t_1$, the system controller 18 applies a high-level fader-on signal. The signal turns on the transistor $Q_1$, allowing the capacitor C to discharge. If the constants of the resistors $R_1$ and $R_2$ are set so that the preceding discharge causes the diode D to become nonconductive, no current flows in the bias circuit 32. At a point in time $t_2$, a predetermined period of time after the point in time $t_1$, the system controller 18 applies a low-level fader-off signal. This signal causes the capacitor C to start charging with a time constant of $(R_1+R_2)C$. The charging causes the potential resistors $R_1$ and $R_2$ to raise the level of their partial potential point. At the point in time $t_3$ when the diode D becomes conductive, a current starts flowing gradually through the vias circuit 32. In accordance with this, the bias oscillation circuits 12 and 13 are controlled so that the bias current supplied to the recording heads 8 and 9 gradually increases.

The fade-out process is achieved as follows: The bias current directed at the recording heads 8 and 9 is gradually increased without these heads being supplied with the signal to be recorded thereby. This causes the recorded portion of the magnetic tape to be gradually erased. Since the level of the recording signal slowly drops, the fade-out effect is acquired.

In the above-described tape editing system, the two tape decks 2 and 3 may have magnetic tapes of different lengths loaded therein. Typically, a 46-minute magnetic tape may be loaded in the tape deck 2 and a 60-minute tape in the tape deck 3. In that case, the magnetic tapes are edited by the processor of the system controller 18 in the manner illustratively described below by referring to the flowchart in FIG. 4 and to the timing chart in FIG. 7.

In response to a tape editing command, the processor performs a preparatory process in step S1 in which the beginning of side A is reached on each of the magnetic tapes in the tape decks 2 and 3. In step S2, the tape decks 2 and 3 are placed in the recording mode (REC). After a predetermined time (e.g., 10 seconds) has elapsed in step S3, the CD player 1 is put in the play mode (PLAY) in step S4. On their respective magnetic tapes, the tape decks 2 and 3 now simultaneously record a plurality of pieces of music being reproduced successively by the CD player 1.

During the parallel recording operation of the tape decks 2 and 3, the processor checks in step S5 to see if either of the tape decks (deck 2 in this example) has come to a stop. If the tape deck 2 stops halfway through, say, the fourth piece of music reproduced, the processor carries out in step S6 the fade-out process on the ending portion of that last recorded piece of music. In step S7, the recording side of the magnetic tape is switched from side A to side B on the tape deck 2. As described above, the fade-out process is performed by the fader circuit 14 after the magnetic tape is rewound for a predetermined period of time from the tape end.

Meanwhile, the CD player 1 keeps reproducing the fourth piece of music and the tape deck 3 keeps recording it. In step S8, the processor checks to see if the playback of the fourth piece of music is completed. The reproduction of a piece of music may be illustratively detected to be completed as follows: A frame number from the Q channel data, a sub-code recorded on the disk, is compared with the last frame number of each piece of music obtained from the TOC (table of contents) information read beforehand from the lead-in area before the playback begins. When the playback of the fourth piece of music is found to be completed in step S8, then in step S9 the tape deck 3 is put in the recording pause mode (REC PAUSES); the CD player 1 is stopped, and the beginning of the fourth piece of music is searched for and reached. In step S10, the CD player 1 starts to play, and the tape deck 2 begins its recording operation. In this step, on the tape deck 2, the fourth piece of music, which is the last recorded piece of music on side A, begins to be recorded on side B. In step S11, the processor checks to see if reproduction of the fourth piece of music has come to an end. With the playback of the current piece of music ended, the tape deck 3 is placed in the recording mode in step S12. From this point, the two tape decks 2 and 3 resumes their parallel recording operation, the deck 2 operating on side B and the deck 3 on side A.

During the paralled recording operation of the tape decks 2 and 3, the processor checks in step S13 to see if the other tape deck (tape deck 3 in this example) has come to a stop. If the tape deck 3 stops halfway through, say, the sixth piece of music being reproduced, the fade-out process is carried out in step S14 on the ending portion of that last recorded piece of music. In step S15, the recording side of the magnetic tape is switched from side A to side B on the tape deck 3.

Meanwhile, the CD player 1 keeps playing and the tape deck 2 continues its recording operation. The processor checks in step S16 to see if the sixth piece of music has come to an end. With the piece of music ended, then in step S17 the tape deck 2 is put in the recording pause mode (REC PAUSE), the CD player 1 is stopped, and the beginning of the sixth piece of music is searched for and reached. In step S18, the CD player 1 starts playing and the tape deck 3 begins its recording operation. In this step, on the tape deck 3, the sixth piece of music, which is the last recorded piece of music on side A, is recorded from the beginning on side B. While the recording is under way, the processor checks in step S19 to see if reproduction of the sixth piece of music is completed. With playback of the piece of music ended, the tape deck 2 is put in the recording mode in step S20. From this point, the two tape decks 2 and 3 resume their recording operation together on side B.

Since the recording operation ends earlier on the tape deck 2 loaded with the shorter magnetic tape, the processor checks in step S21 to see if the tape deck 2 has come to a stop. When the deck 2 is found to be stopped, the processor performs the fade-out process in step S22 on the ending portion of the last recorded piece of music. From this point on, only the tape deck 3 continues the recording operation. The processor checks in step S23 to see if the tape deck 3 has come to a stop. When the deck 3 is found to be stopped, the processor carries out the fade-out process in step S24 on the ending portion of the last recorded piece of music.

The above-described steps, when carried out, makes it possible to record a plurality of pieces of music on two magnetic tapes of different lengths without leaving blank portions on either side of the tapes. Thus the overall tape resources are efficiently utilized in recording pieces of music.

Figure 5:
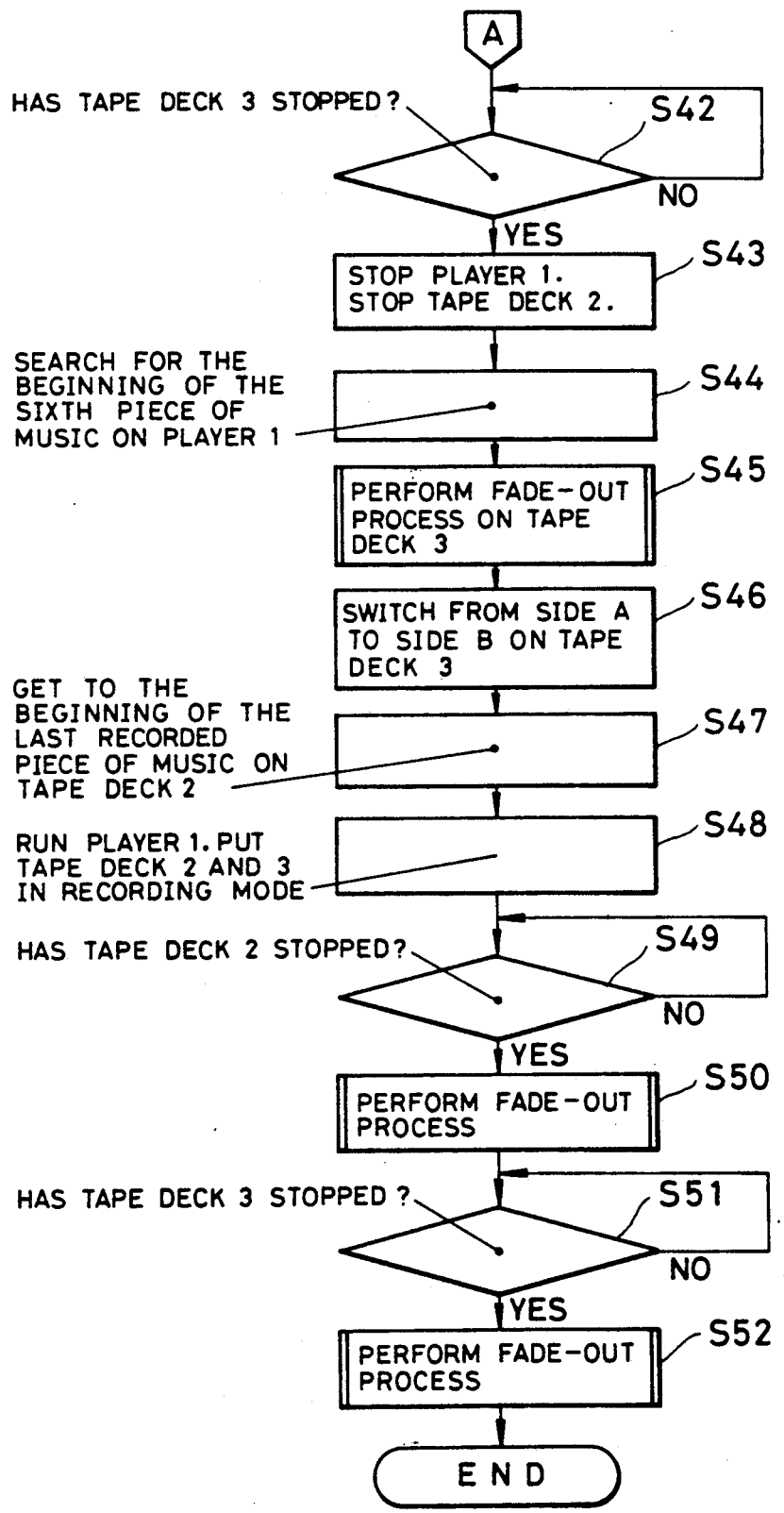
Figure 8:
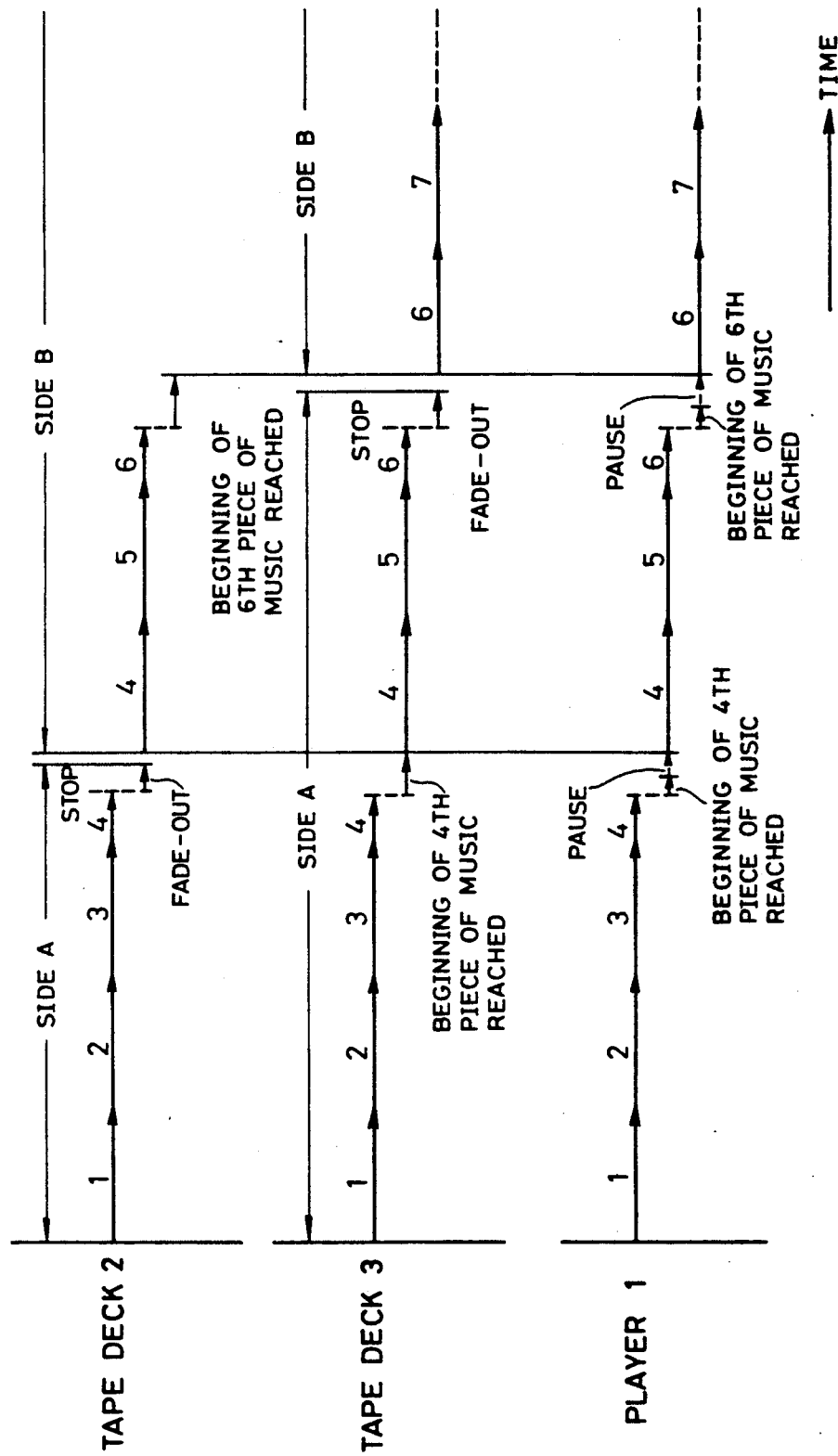

FIG. 5 is a flowchart showing the processing steps which, according to the present invention, constitute another control method allowing the processor to edit magnetic tapes during recording. The steps involved will now be described by referring to the flowchart in FIG. 5 and to the timing chart in FIG. 8. Steps S31 through S34 in the flowchart of FIG. 5 are the same as steps S1 through S4 in the flowchart of FIG. 4.

When the tape decks 2 and 3 are in parallel recording operation, the processor checks in step S35 to see if the tape deck 2 has come to a stop. If the tape deck 2 is found to be stopped halfway through, say, the fourth piece of music being reproduced, the playback of the CD player 1 and the recording of the tape deck 3 are immediately stopped in step S35. In step S37, the beginning of the fourth piece of music is searched for and reached on the CD player 1. The CD player 1 remains at, and is ready to play back, the beginning of the fourth piece of music. Concurrently, the processor performs the fade-out process in step S38 on the ending portion of the last recorded piece of music on the tape deck 2. In step S39, the recording side of the magnetic tape is switched from side A to side B on the tape deck 2. In step S40, on the tape deck 3, the beginning of the last recorded piece of music is searched for and reached. In step S41, the CD player 1 starts playing and the tape decks 2 and 3 begin their recording operation. In this step, the tape deck 2 starts recording on side B the fourth piece of music which was the last recorded piece of music on side A, and the tape deck 3 resumes recording on side A the fourth piece of music that was recorded last.

In step S42, the processor checks to see if the tape deck 3 has come to a stop. If the tape deck 3 is found to be stopped halfway through, say, the sixth piece of music being reproduced, the playback of the CD player 1 and the recording of the tape deck 2 are immediately stopped in step S43. In step S44, the beginning of the sixth piece of music is searched for and reached on the CD player 1. The CD player 1 remains at, and is ready to play back, the beginning of the sixth piece of music. Concurrently, in step S45, the fade-out process is carried out on the ending portion of the last recorded piece of music on the tape deck 3. In step S46, the recording side of the magnetic tape is switched from side A to side B on the tape deck 3. On the tape deck 2, in step S47, the beginning of the last recorded piece of music on the magnetic tape is searched for and reached. Then in step S48, the playback of the CD player 1 and the recording of the tape decks 2 and 3 are resumed. In this step, the tape deck 2 starts recording on side B again the sixth piece of music which was recorded last, and the tape deck 3 begins recording on side B the sixth piece of music which was the last recorded piece of music on side A. From this point onward, the tape decks 2 and 3 perform their recording operation together on side B.

During the parallel recording operation of the tape decks 2 and 3, the processor checks in step S49 to see if the tape deck 2 has come to a stop. If the tape deck 2 is found to be stopped, the fade-out process is carried out in step S50 on the ending portion of the last recorded piece of music. From this point on, only the tape deck 3 performs the recording operation. The processor checks in step S51 to see if the tape deck 3 has come to a stop. If the tape deck 3 is found to be stopped, the fade-out process is carried out on the ending portion of the last recorded piece of music in step S52. This completes the flow of the processing steps involved.

In the above-described manner, two magnetic tapes of different lengths can be edited alternatively during their recording so that no blank period is left on either tape.

In the tape editing system of FIG. 1, the fader circuits 14 and 15 are provided for the tape decks 2 and 3, respectively. Alternatively, a single fader circuit may be shared by the tape decks 2 and 3. In that case, however, the fade-out process cannot be performed on each tape deck. This means that it is impossible to apply to the single fader circuit arrangement either of the two processing procedures described above in reference to FIGS. 4 and 5.

Figure 6A:
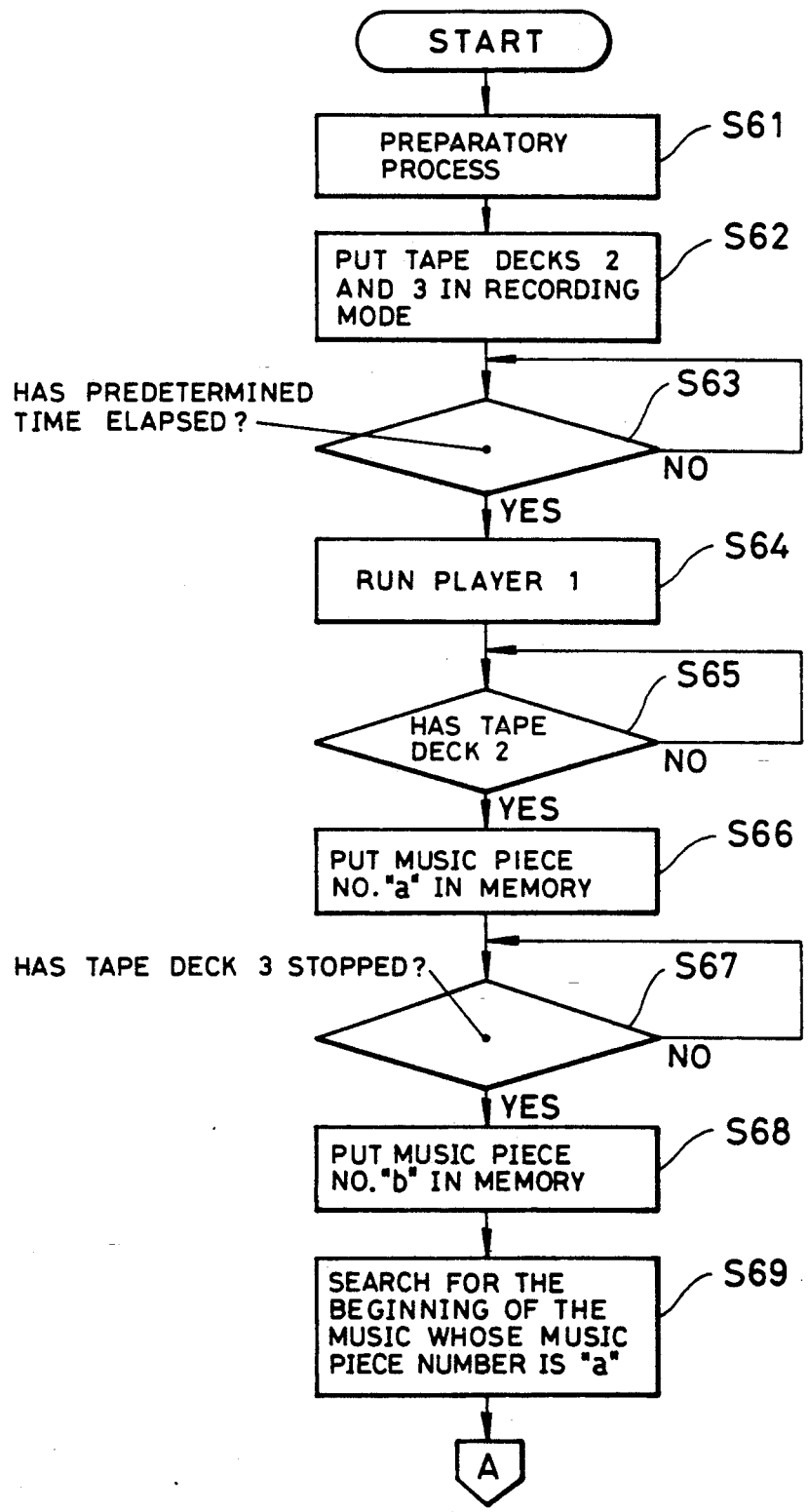

FIG. 6 is a flowchart showing the processing steps which, according to the present invention, constitute yet another control method allowing the process of the system controller 18 to edit magnetic tapes during recording. This time, the tapes are recorded by a tape editing system that shares a single fader circuit. The processing steps involved will now be described by referring to the flowchart in FIG. 6 and to the timing chart in FIG. 9. Steps S61 through S64 in the flowchart of FIG. 6 are the same as steps S1 through S4 in the flowchart of FIG. 4.

During the parallel recording operation of the tape decks 2 and 3, the processor checks in step S65 to see if the tape deck 2 has come to a stop. If the tape deck 2 is found to be stopped halfway through, say, the fourth piece of music being reproduced, a music piece number "a" ("4" in this example) for the piece of music last recorded on side A on the tape deck 2 is stored in internal memory in step S66. Music piece numbers are obtained from the Q channel data, a sub-code recorded on the disk. The playback of the CD player 1 and the recording of the tape deck 3 continue. In step S67, the processor checks to see if the tape deck 3 has come to a stop. If the tape deck 3 is found to be stopped halfway through, say, the sixth piece of music, a music piece number "b" ("6" in this example) for the piece of music last recorded on side A on tape deck 3 is stored in internal memory in step S68.

In step S69, the processor causes the CD player 1 to search for, reach, and remain at the beginning of the piece of music whose music piece number "a" was stored in memory in step S66. In step S70, the processor causes the common fader circuit to perform the fade-out process on the ending portion of the last recorded piece of music on side A of the tape decks 2 and 3. In step S71, the recording side of each magnetic tape is switched from side A to side B. In step S72, the CD player 1 starts playing back the piece of music whose music piece number is "a" and the tape deck 2 starts its recording operation. At this time, the tape deck 3 is in the recording pause mode. Thus the tape deck 2 begins recording on side B the piece of music whose music piece number is "a," i.e., the piece of music last recorded on side A.

In this state, the processor checks in step S73 to see if reproduction of the piece of music whose music piece number is (b−1) is completed. With the playback of that piece of music found to be completed, the processor puts the tape deck 3 in the recording mode in step S74. This causes the tape deck 3 to start recording on side B the piece of music whose music piece number is "b," i.e., the piece of music last recorded on side A. From this point on, the tape decks 2 and 3 resume their parallel recording operation together on side B. During the parallel operation of the tape decks 2 and 3 the processor checks in step S75 to see if the tape deck 2 has come to a stop. When the tape deck 2 is found to be stopped, the processor checks in step S76 to see if the tape deck 3 has come to a stop. When the tape deck 3 is found to be stopped, the processor causes the common fader circuit to carry out the fade-out process in step S77. This completes the processing steps involved.

In the above-described manner, two magnetic tapes of different lengths can be edited again alternatively during their recording so that no blank period is left on either tape.

In the tape editing system whose processing steps are outlined in FIG. 6, a single fader circuit is shared by the tape decks 2 and 3. Alternatively, this processing procedure can also be applied to the tape editing system illustrated in FIG. 1. In this case, the two fader circuits 14 and 15 may be driven simultaneously to achieve the envisioned effect.

The information that magnetic tapes of different lengths have been loaded in the tape decks 2 and 3 may be input beforehand by the user from an input section, not shown, to the processor of the system controller 18. Alternatively, after either of the two tape decks has stopped, the processor may automatically find out that the magnetic tapes on the two tape decks are of different lengths. Specifically, if one tape deck stops and the other deck keeps running past a predetermined playing time allowing for maximum tape length fluctuations, the processor comes to know that the tape lengths are different.

As described above, according to the present invention, magnetic tapes of different lengths loaded in two tape decks may be edited during their recording so that no blank period is left on either side of each tape. In this manner, the overall tape resources are utilized to a maximum during recording of a plurality of pieces of music on at least two tape decks.

What is claimed is:

1. A method for recording information from a recording medium simultaneously onto two magnetic tapes, comprising the steps of:

placing two recorders in a recording mode;

placing a recording medium player in a play mode;

recording information from said recording medium in said recording medium player onto a recording medium in each of said two recorders;

determining if either of said two recorders has come to a stop;

performing fade-out processing on an ending portion of a last piece of information recorded on one of said two recorders which has been determined to have come to a stop, designated the first recorder;

continuing to record the last piece of information on the one of said two recorders determined not to have come to a stop, designated the second recorder, until the last piece of information is completely recorded;

placing said second recorder in a pause mode;

switching to a second recording side of the recording medium in said first recorder;

searching said recording medium player for the beginning of said last piece of information recorded on said recording medium in said second recorder;

recording said last piece of information onto said second recording side of the recording medium in said first recorder;

placing said second recorder in a recording mode; and simultaneously recording further information from said recording medium player onto said recording medium in both said first and second recorders after said last piece of information is completely recorded on said second recording side of the recording medium in said first recorder.

2. A method as claimed in claim 1, further comprising the steps of:

determining if the second recorder has come to a stop;

performing fade-out processing on an ending portion of a final piece of information recorded on said second recorder if it has been determined to have come to a stop;

continuing to record the final piece of information on said first recorder until the final piece of information is completely recorded;

placing said first recorder in a pause mode;

switching to a second recording side of the recording medium in said second recorder;

searching said player for the beginning of said final piece of information recorded on said recording medium in said first recorder;

recording said final piece of information onto said second recording side of the recording medium of said second recorder;

placing said first recorder in a record mode; and simultaneously recording further information from said recording medium player onto said recording medium in both said first and said second recorders after said final piece of information is completely recorded on said second recording side of said second recorder.

3. A method as claimed in claim 2, further comprising the step of performing a fade-out process on the second recording side of the recording medium in said first recorder when it is determined that said first recorder has stopped for a second time.

4. A method as claimed in claim 3, further comprising the step of performing a fade-out process on the second recording side of the recording medium in said when it is determined said second recorder has stopped for a second time.

5. A method for recording information simultaneously onto two magnetic tapes, comprising the steps of:

placing two recorders in a recording mode;

placing a recording medium player in a play mode;

recording information from said recording medium in said recording medium player onto a first side of a medium in each of said two recorders;

determining if one of said two recorders has come to a stop, the recorder determined to have come to a stop being designated a first recorder;

immediately stopping the player and the recorder determined not to have come to a stop, designated the second recorder, if it is determined that said first recorder has stopped;

searching, by said player, for the beginning of a last piece of information recorded by said two recorders;

performing fade-out processing on a last piece of information recorded by said first recorder;

switching to a second recording side of the medium in said first recorder;

searching the second recorder for the beginning of said last piece of information recorded; and simultaneously recording information from said recording medium player onto said medium in both said first and second recorders from the beginning of said last piece of information.

6. A method as claimed in claim 5, further comprising the steps of:

determining if said second recorder has come to a stop;

immediately stopping the player and said first recorder, if it is determined that said second recorder has stopped;

searching, by said player, for the beginning of a final piece of information recorded by said first and second recorders;

performing fade-out processing on said final piece of information recorded on said second recorder;

switching to a second recording side of the medium in said second recorder;

searching said first recorder for the beginning of said final piece of information recorded; and simultaneously recording information from said recording medium player onto said medium in both said first and second recorders starting from the beginning of said last piece of information.

7. A method as claimed in claim 6, further comprising the step of performing a fade-out process on the second side of the medium in said first recorder when it is determined that said first recorder has stopped a second time.

8. A method as claimed in claim 7, further comprising the step of performing a fade-out process on the second side of the medium in said second recorder when it is determined said second recorder has stopped a second time.

9. A method for recording information from a recording medium simultaneously onto two magnetic tapes, comprising the steps of:

placing two recorders in a record mode;

placing a recording medium player in a play mode;

recording information from said recording medium in said recording medium player onto a first side of a medium in each of said two recorders;

determining if one of said two recorders has come to a stop, the recorder determined to have come to a stop designated the first recorder, the other being designated the second recorder;

recording in a memory a first position when it is determined said first recorder has come to a stop;

recording in the memory a second position when it is determined the second recorder has come to a stop;

performing fade-out processing on the medium in said first recorder;

switching to a second recording side of the medium in said first recorder;

performing fade-out processing on the medium in the second recorder;

switching to a second recording side of the medium in the second recorder;

searching, by said player, for the beginning of information corresponding to said first position;

recording onto said second recording side of the recording medium in said first recorder from said beginning of information corresponding to said first position; and simultaneously recording onto said recording medium in both said first and second recorders when the beginning of information corresponding to said second position is reached.

* * * * *